United States Patent [19]

Liberto et al.

[11] Patent Number: 4,476,774
[45] Date of Patent: Oct. 16, 1984

[54] PORTABLE UNIVERSAL WIND DEFLECTOR

[76] Inventors: Samuel J. Liberto, 429 Parker St.; James Meli, 6981 Verona St., both of Verona, Pa. 15147; Eugene J. Berardi, 6882 Alcoma Dr., Penn Hills, Pa. 15235

[21] Appl. No.: 365,506

[22] Filed: Apr. 5, 1982

[51] Int. Cl.³ ............................................... B60J 1/20
[52] U.S. Cl. ..................................................... 98/2.13
[58] Field of Search ...................... 98/2, 2.12, 2.13, 25, 98/27, 28, 44; 296/91, 152, 154

[56] References Cited

U.S. PATENT DOCUMENTS

| | | | |
|---|---|---|---|
| 107,163 | 9/1870 | Conrad | 98/27 |
| 1,019,696 | 3/1912 | Peddy | 98/27 |
| 2,561,778 | 7/1951 | Bohnenblust | 98/2.12 |
| 3,434,408 | 3/1969 | Rivers et al. | 98/2.13 |
| 4,191,097 | 3/1980 | Groen | 98/2.12 |

FOREIGN PATENT DOCUMENTS 705961 5/1941 Fed. Rep. of Germany ....... 98/2.13
668608 3/1952 United Kingdom ..................... 98/2

*Primary Examiner*—Albert J. Makay
*Assistant Examiner*—Harold Joyce
*Attorney, Agent, or Firm*—Harold A. Williamson

[57] ABSTRACT

A universal wind deflector for use in a vehicle window when the window is open. The deflector has a body that has a first and a second planar portion integrally joined along a line contained by both the first and second planar portions. This arrangement defines an overall deflector body which has the first and second planar portions joined at an angle, one to the other. The first and second planar portions each have separate window engaging means formed at one end of each of the planar portions. The other ends of each of the planar portions are provided with means to mechanically couple either end of the planar portion to a portion of the window frame whereupon, depending upon which of the first or second window engaging means are mechanically coupled to the open window, air currents from wind passing the vehicle will be drawn into the vehicle or be deflected away.

7 Claims, 10 Drawing Figures

PORTABLE UNIVERSAL WIND DEFLECTOR

TECHNICAL FIELD

This invention relates to a wind deflector for use in an open vehicle window.

BACKGROUND ART

Since the earliest days of enclosed motor vehicle travel there has been a concern as to the provision of windows that allowed the vehicle occupants to see out while also being moveable to an open position to provide for the ventilation of the vehicle. It is common knowledge that in the early days of motor vehicles, the vehicles were designed to have single panes of glass that could be moved from a closed to an open position. Even in the early days it was recognized that some form of auxiliary ventilation other than an open window was necessary to reduce the buffeting of the vehicle's occupants by air currents from an open window.

Typical of this effort is the ventilation for motor cars of H. Liebig U.S. Pat. No. 1,891,390 which consisted of a guide plate having a cover plate at the top and bottom and standing obliquely to the window, so that it acts similar to a wind screen against which the wind strikes and is deflected so that it cannot penetrate into the interior of the car, but exerts a suction effect sucking the foul air from the air.

A similar device to suck foul air from a vehicle, is set forth in the J. O. Smith U.S. Pat. No. 1,660,893, in which Smith provides a ventilator for closed cars which is adapted to be placed in a window opening between the upper edge of the sliding window and the top of the window frame. In the Smith patent it is indicated that when the car is in motion there will be a strong current of air over the rearwardly inclined louvers 13, which will create a suction through the openings 14 to draw air from the interior of the car.

Neither the Liebig patent nor the Smith patent just described entertains or suggests a means to introduce air currents into a vehicle by the means of a wind deflector that can also be positioned to establish wind deflection and the suction removal of air from within the vehicle, all of which features are present in the invention to be described hereinafter.

With the passage of time, it became apparent that wind deflectors or wind wings as they were sometimes called, should be included as an integral part of the vehicles front or rear windows. The patent to R. M. Bryce, U.S. Pat. No. 2,573,396 evidences in FIG. 1, just such a wind wing or vent window 15. The Bryce patent further concerns itself with the provision of a portable wind deflector 16 that may be secured in the rear portion of a window opening to prevent unwanted drafts from entering the rear of the vehicle and circulating through the remainder of the vehicle. The Bryce invention does not contemplate or suggest that the wind deflector 16 may be used to draw air currents into the vehicle interior in the manner which the invention to be described uniquely provides.

The desirability of drawing fresh air in a directed fashion into the rear compartment of a vehicle is shown by the H. B. Riggs U.S. Pat. No. 2,586,090, where an air deflector 20 is illustrated as positioned between a partially open window 18 and a window frame 16. The air deflector of Riggs cannot be employed to additionally provide air suction and air turbulence reduction to the vehicle interior, as will be evident in the invention to be described.

Automobiles of the current era have come full circle in respect of the provision of cars that have no vent windows at all. The advent of air-conditioning, which is nearly standard equipment on most cars, coupled with a desire to provide cars with sleeker and more aerodynamically smooth lines, have forced the removal of auxiliary vent windows.

However, the rising price of fuel and the reduced gasoline mileage experienced by cars with air-conditioning are leading more and more people to either not purchase air-conditioning for their cars, or to travel with the winddows open to gain the desired cooling. The presence of built-in air flow systems that provide a continuous flow of air through the vehicle are often found insufficient, especially when the entire vehicle has been parked in the sun and its body temperature elevated such that air drawn through the ducting in the body of the car arrives in the passenger compartment at a temperature that is greater than the ambient air surrounding the car.

Into this just described environment, the invention to be described provides a most novel and simple solution.

DISCLOSURE OF INVENTION

The present invention relates to a universal wind deflector for use in a vehicle window when the window is open. The deflector has a body that has a first and a second planar portion integrally joined along a line contained by both the first and second planar portions. This arrangement defines an overall deflector body which has the first and second planar portions joined at an angle, one to the other. The first and second planar portions each have separate window engaging means formed at one end of each of the planar portions. The other ends of each of the planar portions are provided with means to mechanically couple either end of the planar portion to a portion of the window frame whereupon, depending upon which of the first or second window engaging means are mechanically coupled to the open window, air currents from wind passing the vehicle will be drawn into the vehicle or be deflected away.

In one embodiment of the invention, the first planar portion has integral therewith a means to direct air currents entering from a horizontal direction to a downward direction, to thereby cool the lower extremities of a vehicle's occupant.

It is therefore a primary object of this invention to provide a portable universal wind deflector, that depending upon its positioning in an open vehicle window, will allow air outside a moving vehicle to be directed into the vehicle or alternatively positioned so as to deflect the outside air away from the open window while simultaneously establishing a suction effect on the air within the vehicle.

In the attainment of the foregoing object, the invention contemplates a portable universal wind deflector for use in a vehicle window opening with a window member in an open position and moveable from the open position to a closed position, whereupon the window member engages a window member receiving means. The window member receiving means may be a mating channel into which the window fits, or it may be a semirigid rubber sealing flange. The wind deflector is capable of providing air currents into the vehicle interior while being manually positionable to deflect air currents away from the window opening, and thereby drawing air from the vehicle interior.

The wind deflector is comprised of a body which has first and second planar portions integrally joined along a line contained by both the first and second planar portions to thereby form a body with the first and second planar portions at an angle to each other.

The first and second planar portions have separate window engaging means formed at one end of the planar portions, to thereby mechanically couple the wind deflector to the window. These window engaging means have a generally "U" shaped cross-section configuration which matingly cooperates with the window member. The window engaging means of the first and second planar portions are physically co-extensive with the respective planar portions up until a point on either side of the line that is contained by the first and second planar portion to thereby establish a space between the window engaging means of the first and second planar portions.

At the other end of each of the planar portions there is provided means to mechanically couple either of the planar portions to the window member receiving means. The just described structure will provide, depending upon which of the first or second window engaging means is mechanically coupled to the window member, air currents from wind passing the vehicle to be drawn into the vehicle or deflected away, thereby drawing air from the interior of the vehicle.

Other objects and advantages of the present invention will be apparent upon reference to the accompanying description when taken in conjunction with the following drawings:

BEST MODE FOR CARRYING OUT THE INVENTION

Figure 1:
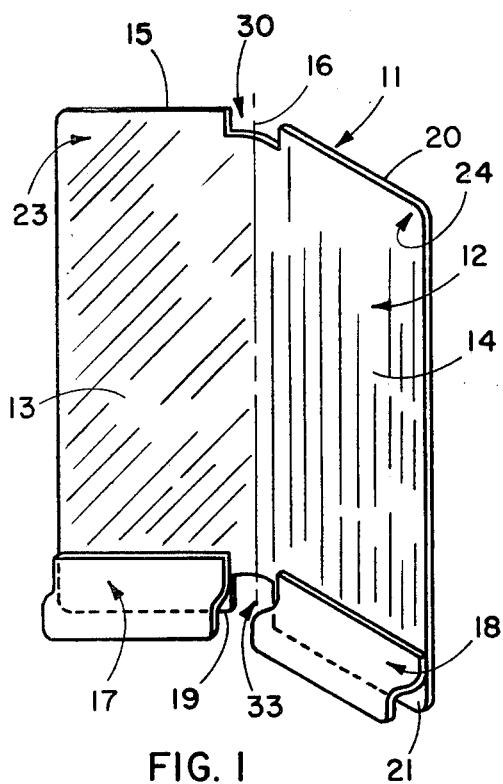
FIG. 1 is a three dimensional view of the portable universal wind deflector embodying the invention.
Figure 2:
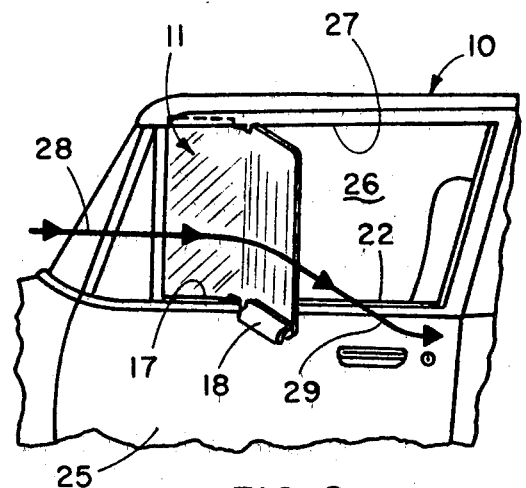
FIG. 2 illustrates the wind deflector of FIG. 1 in a vehicle window in a position to deflect wind from entering a vehicle interior.

Reference is now made to FIG. 1 which illustrates in a three-dimensional form a portable universal wind deflector 11 for use in a window opening 26, FIG. 2. The wind deflector is preferably made of clear plastic material. The description that follows next will best be understood if FIG. 1 and FIG. 2 are studied in conjunction with the explanation now to be offered. The wind deflector 11 is comprised of a wind deflecting body 12 that has a first and second planar portions 13, 14 integrally joined along a line 16 contained by both the first and second planar portions 13, 14. As can be seen in FIG. 1, this just described configuration of planar portions creates a wind deflecting body 12 with the first and second planar portions 13, 14 at an angle to each other.

In FIG. 2 there is illustrated a vehicle 10 which has a window opening 26 into which the window deflector 11 can be positioned. FIG. 2 depicts that wind deflector 11 in a position to deflect wind indicated by arrow 28 away from the window opening 26 as is shown by arrow 29. Within the window opening 26 a window member 22 is moveable between an open position as shown to a closed position with the window member 22 raised such that the upper edge of the window member 22 engages a slot or window engaging means 27. The wind member 22 in a wholly conventional fashion is stored within the vehicle door 25 when the window member 22 is lowered.

Returning to FIG. 1, it will be observed that the wind deflector body 12 earlier described and its first and second planar portions 13, 14 have at their lower ends 19, 21 first and second window engaging means 17, 18. The first and second window engaging means in the preferred form of a generally "U" shaped configuration so that window member 22 when manually raised from a lowered position engage the "U" shaped openings presented by the window engaging means 17, 18. The window engaging means 17, 18 may be fastened to the planar portions 13, 14 by any suitable fastening means and may alternatively be integrally formed of the same material that the wind deflector 11 is composed.

At the other end 23, 24 of each of the planar portions 13, 14 there is provided means 15 and 20 to mechanically couple either of the planar portions 13, 14 to the window member receiving slot or means 27 depending upon which of the first or second window engaging means 17, 18 are mechanically coupled to the window member 22.

A significant feature of the portable universal wind deflector 11 resides in the presence of spaces 30 and 33. It will be observed that the means 17, 18, 15, 20 to mechanically couple the planar portions to either the window member 22 or the window receiving means 27 are physically co-extensive with the planar portions 13, 14 up until a point on either side of the line 16 to thereby establish the spaces 30, 33. These spaces 30, 33 allow the wind deflector 11 to be mounted in a universal manner to be described more fully hereinafter.

Figure 3:
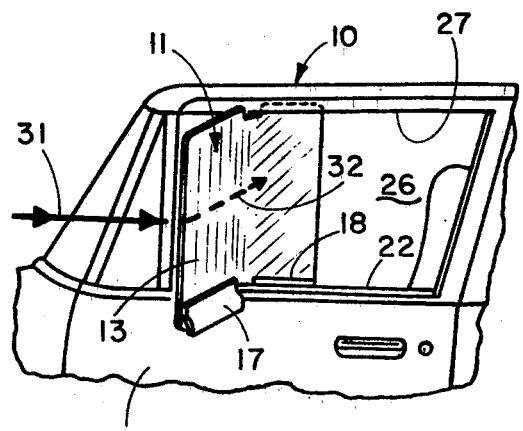
FIG. 3 illustrates the wind deflector of FIG. 1 in a vehicle window in a position to deflect wind into a vehicle interior.

Referring now to FIG. 3, it will be seen that the wind deflector 11 of FIG. 1 has been positioned in the window opening 26 in a manner such that wind current 31 strikes the first planar portion 13 and is directed into the vehicle 10 as is indicated by the arrow 32 shown in broken line.

Figure 4:
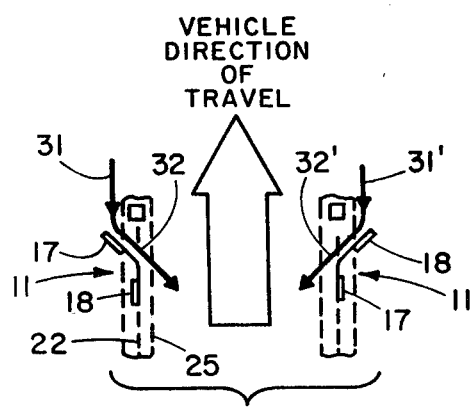
FIG. 4 and 5 illustrate the universal manner in which the wind deflector embodying the invention may be utilized.
Figure 5:
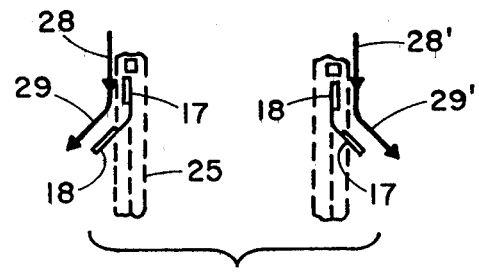

Attention is now directed to FIGS. 4 and 5 in which there is shown schematically the universal wind deflector 11 in every conceivable position in which the invention may be utilized. It should be noted that a single wind deflector 11 may be used on either side of a vehicle, FIG. 4, to provide forced ventilation, see wind current arrows 31, 32, 31', 32'. The wind deflector 11 of FIG. 5 shows the same wind deflector 11 of FIG. 1 turned and mounted in a manner that deflects the wind currents away from the vehicle window opening. The deflected wind currents are shown by arrows 28, 29, 28', 29'.

Figure 6:
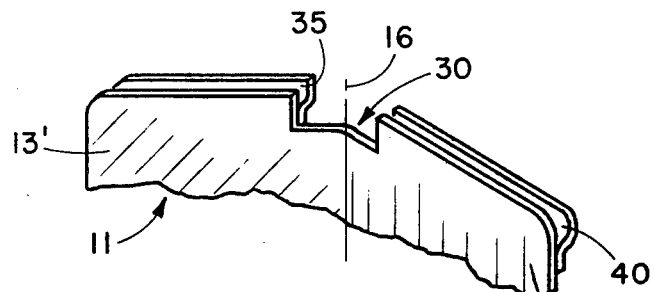
FIG. 6 illustrates in a three-dimensional manner another embodiment of a feature of the invention.

Reference is now made to FIG. 6 which illustrates only the upper portion of a wind deflector 11 and includes a variation of the mechanical means that may be employed in a vehicle window opening where there is no slot to receive the window member 22. There are some vehicles in which the window member 22 is raised into functional contact with a downwardly dependent rubber or semi-rigid piece at the top of the window members travel. When such is the environment, the variation illustrated in FIG. 6 will find utility. Accordingly, the first and second planar portions 13', 14' terminate with "U" shaped means 35, 40. The "U" shaped means 35, 40 receive the downwardly dependent semi-rigid piece, not shown.

Figure 7:
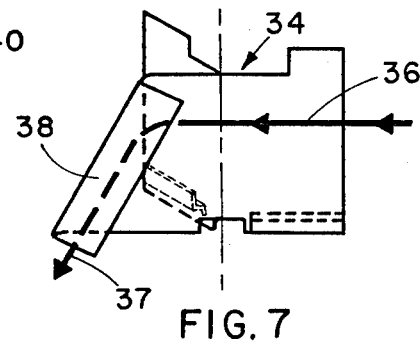
FIG. 7 is a three-dimensional showing of another embodiment of the invention.
Figure 8:
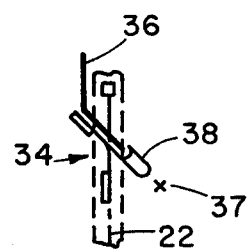
FIG. 8 depicts an air-flow current path established when the embodiment of FIG. 7 is utilized in a vehicle window.

In FIG. 7 there is illustrated another variation of the inventive concept in which, to the wind deflector 34, there has been added a curved member 38 integrally formed as shown with a planar surface. The curved member 38 functions to direct horizontal wind current 36 into downward air current 37 to thereby cool the lower extremities of the vehicle's occupants. In FIG. 8 there is shown schematically the wind deflector 34 in position on the left hand side of a vehicle. It is recognized that this species of the invention is not universal in its utility as is the case with the preferred embodiment of the invention.

Figure 9:
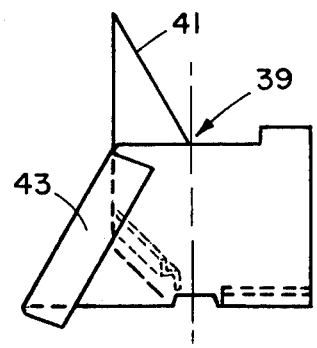
FIG. 9 is yet another embodiment of the invention.
Figure 10:
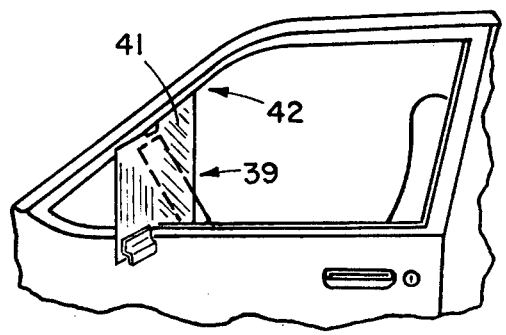
FIG. 10 shows the embodiment of FIG. 9 in place of a vehicle window of a configuration that differs from the vehicle window openings of FIGS. 2 and 3.

FIGS. 9 and 10 illustrate yet another embodiment of the invention wherein the wind deflector 39 has one of the planar portions 41 sloped to match the line of the vehicle window opening 42. The embodiment of FIGS. 9 and 10 may or may not be provided with a curved member 43.

Although this invention has been illustrated and described in connection with the particular embodiments illustrated, it will be apparent to those skilled in the art that various changes may be made therein without departing from the spirit of the invention as set forth in the appended claims.

I claim:

1. A portable wind deflector for use in a vehicle window opening with a window member in an open position and moveable from said open position to a closed position where said window member engages a window member receiving means, said wind deflector capable of providing air currents into a vehicle interior while being manually positionable to deflect air currents away from the window opening and drawing air from said vehicle interior, said wind deflector comprised of, a wind deflecting body having first and second planar portions integrally joined along a line contained by both said first and said second planar portions to thereby form a body with said first and second planar portions at an angle to each other, said first planar portion extending beyond said line contained by both said first and said second planar sections, said extending planar portion having integral therewith means to direct air currents entering from a horizontal direction to a downward direction, said first and said second planar portions having separate first and second window engaging means formed at one end of each of said planar portions, said window engaging means mechanically coupling said wind deflector to said window member, at the other end of each of said planar portions there is provided means to mechanically couple either of said planar portions to said window member receiving means, whereby, depending upon which of said first or said second window engaging means is mechanically coupled to said window member, air currents from wind passing said vehicle will be drawn into said vehicle or deflected away.

2. The wind deflector of claim 1 wherein said means to direct air currents downward is a curved member such that air currents passing along said first planar portion are captured by said curved member and are channeled in a downward direction.

3. The wind deflector of claim 1 wherein said window engaging means is of a generally "U" shaped configuration which matingly receives said window member.

4. The wind deflector of claim 1 wherein said means to mechanically couple said planar portions to said window member receiving means is of a generally "U" shaped cross-sectional configuration which matingly cooperates with said window member receiving means.

5. The wind deflector of claims 1 or 4 wherein said means to mechanically couple said planar portions are physically co-extensive with said planar portion up until a point on either side of said line that is contained by said first and said second planar portion to thereby establish a space between said means that couple said planar portions to said window member receiving means.

6. The wind deflector of claim 1 or 3 wherein said window engaging means of said first and said second planar portion are physically co-extensive with the respective planar portions up until a point on either side of said line that is contained by said first and said second planar portion to thereby establish a space between said window engaging means of said first and said second planar portion.

7. The wind deflector of claim 1 where at least one of the means to mechanically couple the planar portion to said window receiving means is disposed at an angle that matches window receiving means.

* * * * *